United States Patent Office 2,987,533
Patented June 6, 1961

2,987,533
ALUMINUM ALKYLSESQUICHLORIDE PREPARATION

Ralph William King, Altrincham, and David Joseph Movsovic, Timperley, England, assignors to Shell Oil Company, a corporation of Delaware
No Drawing. Filed Oct. 29, 1957, Ser. No. 693,026
Claims priority, application Great Britain Dec. 5, 1956
2 Claims. (Cl. 260—448)

This invention relates to improved processes for producing aluminum alkyl sesquichlorides.

It is known that aluminum alkyl sesquichlorides may be prepared from the reaction of aluminum and primary alkyl chlorides in the presence of small amounts of aluminum alkyl sesquiiodide or aluminum alkyl sesquibromide. The iodides and/or the bromides initiate the reaction whereby aluminum alkyl sesquichlorides are produced. The reaction has heretofore been limited to the production of the methyl and ethyl sesquichlorides because competing side reactions took place. This limitation is a disadvantage which this invention overcomes. By way of illustration, the prior art methods for the production of aluminum ethyl sesquichloride comprise the reaction of finely divided aluminum and about 1% (by weight of the aluminum) of aluminum ethyl sesquiiodide. These materials are charged into a closed reactor and the temperature is raised to about 130° C. Thereafter ethyl chloride is added in an amount in the order of 400% by weight of the aluminum and the reaction mixture is maintained at temperatures ranging from 120 to 150° C. The reaction product is then worked up to isolate the desired aluminum ethyl sesquichloride.

Another disadvantage of prior art methods is that they employ aluminum alkyl sesquiiodides or bromides as initiators for the reaction. This is a disadvantage because the sesquiiodide or sesquibromide must be separately prepared especially for use as an initiator in the production of the aluminum alkyl sesquichloride. This disadvantage is also obviated by the present invention.

It is an object of this invention to provide improved methods for the production of aluminum alkyl sesquichlorides. It is another object of this invention to provide improved methods for the production of aluminum alkyl sesquichlorides whereby the need for an aluminum alkyl sesquiiodide or sesquibromide is avoided. It is yet another object of this invention to provide improved methods for the production of aluminum alkyl sesquichlorides and in particular the methyl and ethyl sesquichlorides. It is still another object of this invention to provide methods for the preparation of higher alkyl sesquichlorides of aluminum. Other objects will become apparent as the description proceeds.

These and other objects are accomplished by the process which comprises reacting aluminum with a primary alkyl chloride in the presence of a minor amount of an aluminum alkyl and a minor amount of a halogen selected from the group consisting of iodine and bromine. It is advantageous to employ a reaction vessel which is equipped with a condenser and distillation column so that aluminum dialkyl chloride may be prepared in situ by the sodium dehalogenation method. It will be understood, however, that the processes of this invention may be employed wholly for the preparation of aluminum alkyl sesquichlorides and that the subsequent dehalogenation is an optional procedure which may be adopted for the production of aluminum dialkyl chlorides or aluminum trialkyls.

The aluminum which is employed for the processes of this invention may be any form. In the preferred embodiment, finely divided aluminum is employed but if desired the aluminum may be in the form of turnings or coarse particles. The quantity of the aluminum which is charged to the reaction vessel may range from about 16 to 20% by weight of the total charge. If desired, larger amounts may be employed but no advantage is obtained thereby.

The alkyl chloride which participates in the reaction may be any primary alkyl chloride. In the preferred embodiment, methyl or ethyl chloride is employed because the products obtained therewith have the greatest utility. Further, that reaction gives high yields more readily. The processes of this invention, however, may be employed with alkylhalides having up to 10 carbon atoms. The alkyl chloride is charged to the reactor in an amount ranging from about 50 to 85% by weight of the total charge with amounts ranging from about 65 to 75% being preferred.

The aluminum alkyls employed as the initiator, is present in an amount between 4 and 10% by weight. Any aluminum alkyl may be employed including the dialkyl chlorides, trialkyls, monoalkyl dichlorides or any combination thereof including the alkyl sesquichlorides. A particularly advantageous method of proceeding is to employ an aluminum alkyl wherein the alkyl radicals have the same number of carbon atoms as in the alkyl chloride. Thus, for example, if aluminum ethyl sesquichloride is to be prepared then it is most preferred to employ an initiator such as aluminum diethyl chloride or aluminum triethyl. In the most preferred embodiment the initiator is selected from the aluminum dialkyl chloride in which the alkyl radical has the same number of carbon atoms as the alkyl chloride in which event it may be ultimately recovered as part of the final product when the sodium dehalogenation method is employed for the preparation of aluminum dialkyl chlorides.

The elemental halogen which is employed in the processes of this invention is present in the reactor in quantities ranging from 0.5 to 1.0% by weight. Iodine is preferred since it is easier to handle but the ultimate choice between iodine and bromine may be based purely on cost considerations.

The processes of this invention may be conducted by charging the various ingredients to the reactor in any desired order except that it is found to be preferable to add alkyl chloride last. Thus, for example, the aluminum, the aluminum alkyl promoter and the iodine or bromine may be mixed together and heated to a temperature between 120–150° C. Thereafter the alkyl chloride is added, with agitation, while the temperature is maintained within the range of 120–150° C. After the reaction is complete the aluminum alkyl sesquichloride may be recovered from the reaction vessel by any suitable means. As the temperatures at which the reaction is conducted is relatively low employment of elevated pressures is not necessary. If desired, the reaction may be conducted in a pressure vessel at elevated pressures but operation at elevated pressure affords no substantial processing advantage.

After the sesquichloride is prepared it may be reacted in situ by any known method to produce aluminum trialkyl or aluminum dialkyl chloride. One such method is the "sodium dehalogenation method" which comprises reacting the sesquihalide with an alkali metal as sodium or potassium at temperatures ranging from 100–200° C.

The invention is described in greater detail in the following examples:

Example I

A 25 gallon steel reactor, provided with an agitator, condenser and means for distilling under vacuum, is purged with nitrogen. 30 pounds of finely divided aluminum, 8 pounds of aluminum diethyl chloride and 0.9 pound of iodine are then added to the reactor. The resulting mixture is heated to 130° C. with constant stirring after which 111 pounds of ethyl chloride is added during a 3 hour reaction period. During the ethyl chloride addition the temperature is maintained between 120 and 150° C. Thereafter, a sample of the product withdrawn from the vessel is identified as aluminum ethyl sesquichloride. In order to illustrate the in situ preparation of aluminum diethyl chloride the contents of the reaction vessel is heated to 175° C. after which 19 pounds of sodium is added. After a few hours of reacting at 175° C. the contents of the vessel is distilled at 30-37 mm. Hg to yield 92 pounds of aluminum diethyl chloride.

*Example II*

The procedure of Example I is repeated except that a molar equivalent of aluminum triethyl replaces the aluminum diethyl chloride as the initiator. The resulting product is identified as aluminum ethyl sesquichloride which, for this experiment, is not subjected to the sodium dehalogenation reaction.

*Example III*

The procedure of Example II is repeated except that a molar equivalent of bromine replaced the iodine. Substantially the same results are obtained.

*Example IV*

The procedure of Example I is repeated using a molar equivalent of octyl chloride in place of the ethyl chloride. The product is identified as aluminum octyl sesquichloride.

From the foregoing description and examples it will be apparent that the processes hereindescribed are capable of various modifications. Thus, for example, if desired the quantities of the reactants may be varied. Such variation, however, should be maintained within the ratios indicated in order to obtain maximum conversions. As previously indicated the aluminum alkyl sesquichlorides are mainly useful for the preparation of aluminum alkyl chlorides which in turn are used widely as polymerization catalysts for alpha-olefins.

We claim as our invention:

1. The process for preparing aluminum actyl sesquichloride comprising mixing together aluminum, a minor amount of an aluminum alkyl selected from the group consisting of triethyl aluminum and diethyl aluminum chloride and a minor amount of a halogen selected from the group consisting of iodine and bromine, thereafter heating the mixture to a temperature between 120–150° C. and then adding octyl chloride and reacting the mixture at temperatures between 120–150°.

2. The process for preparing aluminum alkyl sesquichloride having from 8 to 10 carbon atoms comprising mixing together aluminum, a minor amount of an aluminum alkyl selected from the group consisting of triethyl aluminum and diethyl aluminum chloride and a minor amount of a halogen selected from the group consisting of iodine and bromine, thereafter heating the mixture to a temperature between 120–150° C. and then adding an alkyl halide having from 8 to 10 carbon atoms and reacting the mixture at temperatures between 120–150° C.

References Cited in the file of this patent

J. Amer. Chem. Soc. 60 (1938), 2276.

Grosse et al.: in "J. Organic Chemistry," vol. 5 (1940), pp. 113 to 115, 119 and 120.